United States Patent Office 3,524,740
Patented Aug. 18, 1970

3,524,740
LITHIUM CHLORIDE SOLUTIONS AS PLANT
DESICCANTS AND DEFOLIANTS
Donald C. Young, Fullerton, Calif., assignor to Union
Oil Company of California, Los Angeles, Calif., a corporation of California
No Drawing. Continuation-in-part of application Ser. No. 577,827, Sept. 8, 1966. This application Feb. 26, 1969, Ser. No. 802,649
Int. Cl. A01n 5/00, 11/00, 11/02
U.S. Cl. 71—69
9 Claims

ABSTRACT OF THE DISCLOSURE

The invention comprises the application of aqueous solutions comprising lithium chloride to the foliage of mature plants to effect desiccation and/or defoliation of the plants and thereby facilitate harvesting of the crops. The treatment can be applied to any plants where the desiccation or defoliation of the plant foliage would be desired, including cotton, potatoes, sugar beets, sugar cane, peppers, milo, roses, pineapple, alfalfa, tomatoes, grapes, etc. A surface active agent can be incorporated in the solution to facilitate wetting of the foliage by the applied solution and aerial or ground rig applications can be employed.

DESCRIPTION OF THE INVENTION

This application is a continuation-in-part of application Ser. No. 577,827 filed Sept. 8, 1966.

The invention comprises the application of aqueous solutions of lithium chloride either alone or combined with ammonium nitrate, ammonium chloride or ammonium sulfate or other desiccants to plants in amounts sufficient to effect desiccation and/or defoliation of the plants.

The use of aqueous solutions are defoliants and desiccants has resulted from the recent improvements in harvesting machinery which permit satisfactory crop harvesting when the plant leaves have been desiccated, even though the plant has not been completely defoliated. The application of the concentrated solution effects defoliation of some of the plant leaves and desiccation of any remaining leaves on the plant. Various concentrated aqueous solutions have been previously suggested for use as defoliants and desiccants. Use of intrinsically toxic materials such as pentachlorophenol, magnesium chlorate, etc., has fallen into disfavor because of the residual toxic effects on animals or on subsequent plantings. These materials are also unsuited for use on vegetable crops because of their hazardous nature. Use of ammonium salts alone or in combination with a surface active agent is disclosed and claimed for defoliation and desiccation in U.S. Pat. No. 3,152,879.

While the use of the aforementioned ammonium salt solutions is quite satisfactory under most circumstances, I have found that comparable and, under some conditions more favorable, desiccation and defoliation can be achieved by applying to the plants an aqueous solution comprising lithium chloride either alone or with other desiccants.

It is an object of this invention to provide an improved method to satisfactorily desiccate leaves of growing plants to facilitate harvesting of the plant.

It is also an object of this invention to obtain a high degree of defoliation in combination with said desiccation.

It is a further object of this invention to provide a harmless composition having little or no residual toxic effects with such desiccation and/or defoliation.

Other and related objects will be apparent from the following disclosure.

I have found that a high degree of desiccation and, in some instances, defoliation can be achieved by the application of concentrated aqueous solutions comprising lithium chloride. The lithium chloride can comprise the entire solute or other desiccation or defoliation agents may be added to the solution to supplement or to improve the effect of the lithium chloride. Other solutes which may be added include ammonium nitrate, ammonium chloride, ammonium sulfate, and soluble thiosulfate salts, as for example the alkali metal, e.g., potassium, sodium, cesium, lithium, etc., and alkaline earth metal, e.g., magnesium, calcium, etc. thiosulfates, as well as ammonium thiosulfate. The preferred salts added to the lithium chloride solution are ammonium, thiosulfate, potassium thiosulfate, ammonium nitrate, or ammonium chloride or mixtures thereof. The combination of ammonium chloride and nitrate, ammonium sulfate and nitrate or ammonium sulfate, nitrate and chloride can also be used. Thus about 5 to 25 weight percent ammonium chloride and/or ammonium sulfate can be added to the commercially available "20–0–0" ammonium nitrate solution (57 weight percent solute) to provide mixed salt solutions. Other solutions having from 0 to about 30 weight percent ammonium chloride, from 0 to about 55 weight percent ammonium sulfate and from about 0 to 65 weight percent ammonium nitrate can be applied with the lithium chloride to the foliage in accordance with my invention. The desiccant-defoliant composition can comprise from 5 to about 50, preferably from 15 to 45 weight percent of any of the aforementioned ammonium salts or thiosulfate salts.

The above materials are applied as aqueous solutions and should contain a sufficient quantity of water to achieve thorough coverage of the plant tissue, however, the solutions should not be so dilute that the solute is washed off the leaves. Even super-saturated solutions which contain suspended solute crystals can be used provided that sufficient liquid is present to adequately distribute the salt on the plant leaves. Generally, solutions or slurries containing from about 5 to about 80 weight percent solute can be used with a maximum solids content of the slurries of about 20 weight percent. Preferably, however, the maximum solute content is the salting out concentration of the solution at the ambient temperature to avoid the difficulties inherent in the handling of a slurry. This concentration is about 45 percent lithium chloride, 55 weight percent ammonium thiosulfate, 65 weight percent ammonium nitrate, 55 weight percent ammonium sulfate and about 30 weight ammonium chloride. The salting out concentration of the aforementioned salts of this invention or combinations thereof is well known in the art or can be readily ascertained.

Preferably, the concentration of the solute should be at least about 10 and, most preferably, at least about 15 weight percent. When the lithium chloride comprises the only desiccant-defoliant solute, a concentration of from 10–45 weight percent is preferred. When other solutes are also employed, the lithium chloride can comprise from 5–50, preferably from 15 to 45, weight percent of the solution.

The choice of the total solute concentrations depends somewhat on the method of application since the most concentrated solutions containing from about 30 to 80 weight percent are preferred for aerial application, where the airplane's capacity generally limits the total volume of solution applied per acre to no greater than about 15 gallons per acre and frequently no greater than 10 gallons per acre. Commercial ground spray equipment do not have a limited spray capacity and therefore even more dilute solutions can be effectively applied by this equipment. The dosage of the aqueous solutions or slurries should be sufficient to provide between about 10 and about 200 pounds per acre of the crop to be treated, preferably between about 15 and 60 pounds per acre.

Preferably a surface active agent is added to the salt solutions to improve their effect. The agent can be used in an amount from 0.1 to about 5; preferably from 0.5 to 2 weight percent. I have found that the presence of the surface active agent achieves a more uniform and consistent effect. In general, any suitable surface active agent can be used such as the cationic, anionic and nonionic types, as well as mixtures thereof.

Examples of the cationic surfactants include: fatty amines, e.g., dodecylamine, octadecylamine (Armeens, Duomeens of Armour Chemical Company); alkarylamines, e.g., dodecylaniline, fatty amides such as fatty imidazolines, e.g., undecylimidazoline prepared by condensing lauric acid with ethylenediamine or oleylaminodiethylamine prepared by condensing oleic acid with asymmetric diethylene diamine (Sapamine CH by Ciba); quaternary alkyl and aryl ammonium salts and hydrates, e.g., cetyltriethylammonium cetyl sulfate, dimethylbenzyldodecylammonium chloride, etc.; quaternary ammonium bases of fatty amines of disubstituted diamines, e.g., oleyl methylamino ethylene diethylamine methyl sulfate (sapamine MS by Ciba), oleylbenzylamino ethylene diethylamine hydrochloride (Sapamine BCH by Ciba); fatty derivates of benzimidazolines such as are prepared by condensation of a fatty acid with orthophenylenediamine followed by alkylation of the condensate with an alkyl halide to yield an N-alkyl alkylbenzimidazole, e.g., N-methyl-N'N'-diethylheptadecylbenzimidazole; N - fatty alkyl pyridinium compounds, e.g., laurylpyridinium, octadecylpyridinium (Fixanol of Imperical Chemical Industries), octadecylmethylenepyridinium acetate; etc. Examples of useful anionic surface active agents include the following: fatty acid glyceride sulfonates and fatty acid sulfonates, e.g., sulfonated cottonseed oil, sulfonated oleic acid, sulfonated sperm oil, sulfonated tallow, etc.; sulfonated fatty amides, e.g., sulfonated amide of ricinoleic acid (Humectol CA by I. G. Farben), sodium salt of sulfuric ester of oleyl diisobutyl amide (Dismulgen V of I. G. Farben), etc.; sulfonated anilides of fats, e.g., sodium salt of sulfuric ester of oleylethyl anilide (Humectol CX by I. G. Farben), etc.; amides of aminosulfonic acids, e.g., sodium sulfonate of oleylmethyl tauride (igapon T by I. G. Farben); amides from condensation of fatty acid chlorides with amino acids, e.g., sodium salt of oleyl sarcoside (Medialan A by I. G. Farben); sulfonated aromatic hydrocarbons, e.g., benzenesulfonic, naphthalenesulfonic acids and their ammonium and alkali metal salts, etc.; alkylaryl sulfonates, e.g., dodecylbenzenesulfonates, octadecylbenzenesulfonates, etc.

Illustrative nonionic compounds include the polyethylene oxide condensates with hydrophobic groups having a reactive hydrogen. The hydrophobic group can have from about 8 to 25 carbon atoms and from 2 to about 15 molecular weights of a hydrophilic group. The hydrophobic group can be selected from a variety of organic compounds having one or more reactive hydrogens including fatty alkyl or alkenyl alcohols, fatty acids, fatty amines, fatty amides, esterified hexitans or alkyl or alkenyl phenols.

As described, the source of the hydrophilic group is ethylene oxide. Other materials can be employed, for example, ethylene chlorohydrin or polyethylene glycol; however, because of its low cost and availability, ethylene oxide is used almost exclusively in the preparation of these materials.

One class of hydrophobic group comprises alkyl or alkenyl phenols wherein the alkyl or alkenyl group or groups contain between about 2 and about 16 carbon atoms. Among such compounds are the following: hexylphenol, hexenylphenol, hexadecylphenol, dodecenylphenols, tetradecylphenol, heptenylcresol, octyl- and octenylcresol, laurylcresol, isoamylcresol, decylrecorcinol, octenylrecorcinol, isododecylphenol, decenylxylenol, etc. Examples of commercially available wetting agents belonging to this class and containing ethylene oxide units are: "Antarax A-201" of the Antara Chemical Company and "Lavacol" of The General Dyestuff Corporation.

A second class of hydrophobic groups comprises fatty acids containing between about 12 and about 22 carbon atoms. Examples of such fatty acids are the following: lauric acid, tridecenoic acid, tetradecenoic acid, pentadecenoic acid, palmitic acid, oleic acid, nonadecanoic acid, docosanoic acid, etc. Examples of commercially available wetting agents having a fatty acid constituent and containing from about 4 to about 9 ethylene oxide units per acid group are the following: "Ninosol 100," "Ninosol 200" and "Ninosol 210" of the Alrose Chemical Company, and "Nopalcol 4-D" of the Nopco Chemical Company.

A third class of hydrophobic groups comprises the alkyl and alkenyl alcohols containing between about 8 and about 22 carbon atoms. Among such alcohols are dodecanol, tridecanol, tetradecanol, pentadecanol, hexadecanol, heptadecanol, octadecanol, docosenol, etc. A commercially available nonionic setting agent of this type and containing ethylene oxide is Brij 30 of the Atlas Powder Company.

A fourth class of the hydrophobic groups comprises long chain alkyl or alkenyl amines or amides containing between about 8 and about 22 carbon atoms. These compounds contain two reactive hydrogens and the polyethylene oxide units are distributed therebetween. Examples of such compounds are dodecanamide, tridecylamine, tetradecenamide, pentanylamine, hexadecylamine, heptadecanamide, octadecylamine, oleyl amide, etc. Examples of commercially available wetting agents in this group containing ethylene oxide are "Ethomide" of the Armour Chemical Company and "Priminox 10" of the Rohm and Haas Chemical Company.

Another class of suitable wetting agents are the reaction products of ethylene oxide with fatty acid partial esters of hexitans. Such compounds are obtained by treating a hexitol, e.g., sorbitol, mannitol, dulcitol, etc., with a dehydrating agent to form the corresponding hexitan, i.e., sorbitan, mannitan, dulcitan, etc. The hexitan is then partially esterified with a long chain fatty acid having between about 8 and about 22 carbon atoms, such as dodecanoic acid, pentadecenoic acid, hexadecanoic acid, oleic acid, stearic acid, etc., to replace one of the reactive hydrogens of the hexitan with the carboxylic radical. The resultant partial ester is then reacted with ethylene oxide so as to add the desired number of ethylene oxide units per mol of the hexitan fatty ester. Commercially available compounds of this type and having a suitable balance between the hydrophobic and hydrophilic groups are "Tween 65" and "Tween 81" of The Atlas Powder Company.

Very suitable emulsifiers comprise the organic substituted ammonium salts of slfodicarboxylic acids that are reacted with various hydrophobic groups such as fatty amides having 12 to 18 carbons to prepare half amides in the manner described in 2,976,209 or with fatty amides having 12 to 26 carbons to prepare half amides in the manner described in 2,976,211, or with polyethoxylated fatty amines in the manner described in 3,080,280, or with fatty acid esters of hydroxylamines to obtain half amides in the manner described in 2,976,208.

A preferred emulsifier is described in U.S. Pats. 3,236,626 and 3,236,627 and comprises the amine salts of a sulfodicarboxylic acid half ester of an alkylphenoxy ethoxy alcohol. These emulsifiers have the following structure:

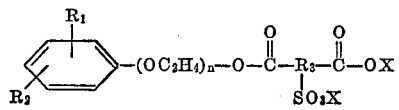

wherein:

$R_1$ is selected from the class consisting of alkyl and alkenyl groups;

$R_2$ is selected from the class consisting of hydrogen, alkyl and alkenyl groups;

$R_3$ is selected from the group consisting of trivalent sulfoalkylene and sulfo-alkenylene groups;

X is an organic aryl, alkyl and hetrocyclic amine cation having from 1 to about 6 carbon atoms;

$n$ is an integer between about 2 and about 5;

and the total of carbons is any $R_1$, $R_2$, $R_3$ group is less than about 12; and preferably less than about 6.

Examples of suitable radicals from which $R_1$ and $R_2$ can be selected are the following: methyl, ethyl, propyl, isopropyl, butenyl, isobutyl, amyl, isoamyl, heptenyl, isoheptenyl, octyl, isooctenyl, nonyl, isononyl, decenyl, isodecyl, undecyl, isoundecenyl, dodecyl, isododecyl, etc.

Examples of various $R_3$ groups are the following: methylene, ethylene, propylene, isopropylene, butylene, isobutylene, pentylene, isopentylene, hexylene, isohexylene, etc.

Various organic amine cations can be used for X such as the primary, secondary and tertiary alkyl, alkaryl and aryl amines as well as heterocyclic compounds containing a basic nitrogen. Examples of suitable amines are the following: methylamine, dimethylamines, ethylamine, triethylamine, diethylbenzylamine, propylamine, isopropylamine, diisopropylamine, ethylpropylamine, butylamine, isobutylamine, diisoamylamine, hexylamine, heptylamine, isooctylamine, furanamine, benzylamine, morpholine, pyridine, etc. Preferred are the alkylamines having between 1 and about 6 carbons, e.g., isopropylamine.

Examples of various compounds useful as emulsifiers in my invention are the following: half isobutylamine salt, half tetraethoxyxylenol ester of sulfogluteric acid; half isopropylamine salt, half triethoxyamylphenol ester of sulfoadipic acid; half amylamine salt, half pentaethoxycresol ester of sulfopimelic acid; half hexylamine salt, half diethoxyoctylphenol ester of sulfosuberic acid; half isopropylamine salt, half diethoxydodecylphenol ester of sulfoazelaic acid; half heptylamine salt, half diethoxydodecylphenol ester of sulfosebasic acid, etc.

Of the aforedescribed emulsifier compounds, the most preferred are those in which the total of carbons in any $R_1$, $R_2$ or $R_3$ group is less than 4 and the number of carbons in the $R_3$ group is 2 or 3. In this most preferred group $n$ preferably equals two The aforementioned emulsifiers are readily prepared by reacting at about 100° C. an unsaturated acid anhydride, e.g., maleic anhydride with a hydrophobic group comprising polyethylene oxide condensate on an alkylphenol. The resultant half ester is then reacted with an organic amine to prepare the salt which is reacted in an alcohol or aqueous media at 60°–85° C. with an amine bisulfide to add the amine sulfonate group to the olefinic bond of the dicarboxylic acid. The aforementioned emulsifiers are also available from the Witco Chemical Company under Emcol H2A or AL40–09 designation.

The invention can be applied to a wide variety of crops to facilitate their mechanical harvesting such as cotton, potatoes, sugar beets, sugar cane, peppers, milo, flowering plants such as roses, pineapple, alfalfa, tomatoes, grapes, etc. When the crop for harvesting comprises a cellulose fiber product such as cotton, slight amounts of phosphates, preferably ammonium phosphates can also be incorporated into the solution to impart a flame proofing to the cellulose. Examples of suitable ammonium phosphates are mono- and di-ammonium orthophosphates, ammonium pyrophosphate, ammonium tripolyphosphate, etc. The amount of ammonium phosphate can be from about 1 to about 15 weight percent and preferably from about 5 to about 12 weight percent.

The following compositions will illustrate solutions that can be used to defoliate and/or desiccate leaves of mature plants in accordance with my invention and it should be understood that other ingredients such as other desiccants or defoliants, and/or the aforementioned surfactants, emulsifiers and/or phosphates may be, but need not necessarily be, incorporated in the compositions:

TABLE 1

Composition 1

| | Weight percent |
|---|---|
| Lithium chloride | 19.0 |
| Emcol H2A | 1.0 |
| Water | 80.0 |

Composition 2

| | |
|---|---|
| Lithium chloride | 44.0 |
| Nonisol 100 | 0.5 |
| Water | 65.5 |

Composition 3 (slurry)

| | |
|---|---|
| Lithium chloride | 50.0 |
| Pluronics 607 | 1.5 |
| Water | 48.5 |

(About 10 percent of the lithium chloride is present as solid crystals).

Composition 4

| | |
|---|---|
| Lithium chloride | 17.5 |
| Ammonium thiosulfate | 35.0 |
| Emcol H2A | 0.5 |
| Water | 48.0 |

Composition 5

| | |
|---|---|
| Lithium chloride | 18.5 |
| Ammonium nitrate | 20.0 |
| Emcol H2A | 0.5 |
| Water | 61.0 |

Composition 6

| | |
|---|---|
| Lithium chloride | 16.0 |
| Ammonium chloride | 10.0 |
| Emcol H2A | 1.0 |
| Water | 73.0 |

The following example will illustrate a mode of practice of my invention:

EXAMPLE 1

The test solutions were applied to a plot of cotton plants varying in height from 36 to about 60 inches. The cotton was of harvesting maturity at the time of application of the solution and had an average petiole salt content, expressed as nitrate, of 762 parts per million. The solutions were sprayed from a hand-pushed rig equipped with five 65° T-Jet nozzles. The rig had upright standards and an overhead yoke that straddled the cotton row and the 5-nozzles were placed on the rig to direct their spray to the center, thereby forming a 5-pointed star spray pattern about the cotton plants.

The test solutions were applied at a rate of 20, 10 and 5 gallons per cotton acre and the cotton was observed for combined defoliation and desiccation after 5 days. The following data were obtained:

TABLE 2

| Solution | Application rate (gallons/acre) | Effectiveness rating [1] |
|---|---|---|
| Composition 2 (lithium chloride) | 20 | 9 |
|  | 10 | 9 |
|  | 5 | 9 |
| Composition 4 (lithium chloride and ammonium thiosulfate). | 20 | 9 |
|  | 10 | 7 |
|  | 5 | 7 |
| Composition 5 (lithium chloride and ammonium nitrate. | 20 | 9 |
|  | 10 | 8 |
|  | 5 | 8 |
| 57% Ammonium nitrate | 20 | 9 |
| 1% Emcol H2A | 10 | 5 |
| Sodium chlorate | 3 | 8 |
| Untreated | 0 | 3 |

[1] The "Effectiveness Rating" is on a scale of 0 to 10 wherein 10 represents complete defoliation and/or desiccation.

The data from the preceding example demonstrates that the lithium chloride solutions alone (Composition 2) or in combination with ammonium thiosulfate nitrate (Composition 4) or ammonium nitrate (Composition 5) are highly effective desiccant and defoliants for mature cotton plants. The lithium chloride solutions are particularly advantageous at the low dosages such as 10 and 5 gallons per acre. This is of particular advantage in regard to vegetable crops where a high application rate can result in high salt residues on the vegetable crop. Although these solutes are harmless and substantially non-toxic, high salt residues are undesired because of the potential influence on the flavor or taste of the harvested product. The application of a highly concentrated lithium chloride solution allows the operator to utilize a low application rate. Hence, a preferred mode of practice is applying a highly concentrated, e.g., 30 to 60 percent solute solution of lithium chloride to the crop at a relatively low application rate, 5 to 15 gallons per acre.

The examples of and illustrative compositions useful in my invention are not to be construed as unduly limiting of my invention but are intended solely to illustrate the invention and set forth a mode of practice thereof. Other compositions described hereinabove may be substituted for the compositions defined in above examples without departing from the mode of practicing the invention. My invention is intended to be defined by the steps and ingredients set forth in the following claims:

I claim:
1. The method of desiccating leaf tissue of mature plants which comprises applying to the foliage of said plants an effective amount of an aqueous solution of lithium chloride.
2. The method of claim 1 wherein said solution also contains a surface active agent.
3. The method of claim 1 wherein the concentration of lithium chloride is 5 to 80 weight percent.
4. The method of claim 3 wherein the application rate of said solution is 5 to 15 gallons per acre and sufficient to apply from 10 to 200 pounds solute per acre.
5. The method of claim 3 wherein the solution is applied at a dosage sufficient to provide from 15 to 60 pounds solute per acre.
6. The method of claim 1 wherein the concentration of lithium chloride is 10 to 45 weight percent.
7. The method of claim 1 wherein said solution also contains ammonium nitrate, chloride or sulfate.
8. The method of claim 7 wherein said lithium chloride comprises from 10–45 weight percent of the solution.
9. The method of defoliating leaves from mature plants which comprises applying to the foliage of said plants an effective amount of an aqueous solution of lithium chloride.

References Cited

UNITED STATES PATENTS 2,726,149  12/1955  Boyd _____ 71—69
3,152,879  10/1964  Yale _____ 71—69

LEWIS GOTTS, Primary Examiner
M. M. KASSENOFF, Assistant Examiner

U.S. Cl. X.R.
71—65, 128